Patented Nov. 3, 1942

2,300,659

UNITED STATES PATENT OFFICE 2,300,659

LEAD RESINATES OF HYDROGENATED ROSIN

Herschel A. Elliott, Wilmington, Del., assignor to Hercules Powder Company, Wilmington, Del., a corporation of Delaware No Drawing. Application September 4, 1941, Serial No. 409,538

8 Claims. (Cl. 260—100)

This invention relates to the production of fused lead resinates and more particularly to fused lead resinates of improved characteristics and to the method of production thereof.

Lead resinates prepared from wood or gum rosin have found wide usage in the protective coating field as driers. They have been prepared by a precipitation method involving double decomposition between an alkali metal salt of the rosin and a soluble lead salt, or by a fusion process involving reaction of the rosin with a basic lead compound at elevated temperature. By the precipitation method it has been possible to introduce an amount of lead up to the theoretical lead content for the lead diresinate. By the fusion method, however, amounts of lead approaching the theoretical for the diresinate have been introduced without blocking but considerable difficulty has been encountered in obtaining fused resinates which are homogeneous and free from large amounts of unreacted salts and lead oxide.

It is an object of this invention to provide homogeneous fused lead resinates of higher lead content than has been possible heretofore.

It is another object to provide homogeneous fused lead resinates containing an amount of lead higher than the theoretical combining proportion for the neutral diresinate.

It is a further object to provide a method of producing homogeneous fused lead resinates having a lead content higher than the theoretical combining proportion for the neutral diresinate.

Other objects of the invention will appear hereinafter.

The above objects may be accomplished in accordance with this invention by fusing a hydrogenated rosin with a sufficient amount of a lead compound capable of reaction with the hydrogenated rosin, at a temperature within the range of about 200° C. to about 330° C. to give a lead resinate of the hydrogenated rosin having a lead content greater than the equivalent combining proportion of the hydrogenated rosin based on its acidity and as high as about 40% by weight. With use of hydrogenated rosin and the fusion procedure described in accordance with this invention it has been found that larger amounts of lead can be introduced than has been possible heretofore.

In carrying out the fusion process of the invention a hydrogenated rosin is fused with a lead compound which is reactive with the hydrogenated rosin to form a salt. Such a compound may be a basic lead compound, a lead salt of a fatty acid or other volatile weak acid or any other lead compound which at the temperature of fusion liberates its lead to form a salt with the rosin. Such lead compounds as the acetate, formate, butyrate, lactate, etc. are quite satisfactory. Lead oxide alone has a tendency to be slightly unreactive, requiring extended heating to obtain complete reaction. It is therefore desirable in using the oxide to also include either a fatty acid salt of lead, a fatty acid salt of some other metal particularly calcium, or zinc, cobalt, manganese, etc. This is particularly desirable when it is desired to introduce the higher amounts of lead. Addition of a volatile organic acid as acetic acid, oxalic acid, etc. also serves to catalyze the lead oxide in the reaction.

The reaction is carried out by heating the hydrogenated rosin to a temperature in the range of about 200° C. to about 330° C. and adding the lead compound, alone or in admixture with a fatty acid salt of another metal as calcium acetate, either gradually or at one time, preferably while agitating the mixture. The reaction is accompanied by considerable foaming and agitation serves to keep such foaming at a minimum. The foaming is more severe at the lower temperature and the reaction is also slower. At temperatures above about 290° C. the reaction is very vigorous but the yield is reduced due to volatilization of light ends from the hydrogenated rosin. The preferable reaction temperature will be from about 200° C. to about 290° C.

The reaction time required will be dependent on the specific temperature employed, the particular reactive lead compound used, the degree of agitation, the amount of metal being introduced, as well as on other factors. Thus, the reaction time may be from about 10 minutes to several hours. More heating at the elevated temperatures, particularly above 300° C., than is necessary to carry out the reaction is disadvantageous at times since the resinate may develop some opacity from such superfluous heating. It will also be desirable to carry out the reaction in the presence of an inert atmosphere, such as may be provided by carbon dioxide, nitrogen, etc. Presence of an inert atmosphere minimizes oxidation of the hydrogenated rosin or the resinate at the elevated temperatures of heating.

The hydrogenated rosin which may be employed in the process of the invention may be produced, as is well known in the art, by contacting wood or gum rosin or the acids contained therein with hydrogen and a suitable hydrogenation catalyst. Thus, by contacting rosin in a fluid condition with hydrogen in the presence of an activated base metal hydrogenation catalyst under a pressure in the range of about 200 to 15,000 pounds per square inch and at a temperature of about 125° C. to about 225° C. a hydrogenated product useful in this invention will be obtained. Hydrogenated rosin may also be obtained by contacting rosin dissolved in a suitable solvent with hydrogen and a noble metal hydrogenation catalyst, as for example platinum, palladium, etc., as is well known in the art. The hydrogenated rosin obtained by any of the above methods will have varying degrees of saturation depending on the actual conditions employed. For use in the present invention a hydrogenated rosin having a saturation value corresponding to at least about 50 per cent saturation of both double bonds of the rosin acid contained in the rosin will be preferred, although rosins of lower saturation may also be employed. Hydrogenated rosins having a saturation of about 50 to about 95 per cent of both double bonds will be particularly desirable in the production of the novel resinates of the invention. After hydrogenation the hydrogenated rosin may be subjected to vacuum distillation to remove the light end or to separate any particular fraction. If desired, it may be subjected to a refining treatment with a selective color-body solvent or absorbent, as furfural, phenol, fuller's earth, etc. The hydrogenated rosin used will generally have an acid number above about 100 and preferably from about 135 to about 185.

The fused lead resinates of high metal content described in accordance with this invention will be found to possess many improved characteristics over the prior lead resinates. They will be considerably more stable both at normal and elevated temperatures than the lead resinates from ordinary rosin and will be much less subject to oxidation and discoloration on storage. Due to their higher lead content they will have higher melting points and coalescing temperatures than prior lead resinates. They will also be less subject to spontaneous ignition than the lead resinates prepared from ordinary rosin. They will be clear and homogeneous and substantially free from precipitated or separated matter. For these reasons they will be considerably more useful as driers in paints and varnishes, in plastics, adhesives, printing inks, etc. They will also find many other interesting uses which will be readily apparent to those skilled in the art.

The following specific examples illustrate the various embodiments of the invention:

Example I

Four hundred parts by weight of a hydrogenated wood rosin saturated to the extent of 63% of both double bonds and having an acid number of 159 and a drop melting point of 75° C. were melted and heated to a temperature of 220° C. in a nitrogen atmosphere. To the molten rosin 320 parts by weight of lead acetate were added in small portions at a time with agitation, while permitting the reaction to become complete before each subsequent addition. The reaction temperature was raised gradually to a maximum of 260° C. during the addition, which required 25 minutes. The lead resinate obtained was a clear homogeneous resin having a drop melting point of 165° C. and a lead content of 30%.

Example II

Using a hydrogenated gum rosin saturated to the extent of 60% of both double bonds of the rosin acids contained therein and having an acid number of 155 and a drop melting point of 79° C., 300 parts by weight of the rosin were melted and heated to a temperature of 250° C. in a nitrogen atmosphere. To the molten hydrogenated rosin, 270 parts by weight of lead acetate were added in small portions at a time with agitation. The reaction temperature was raised gradually to 260° C. during the addition, which was complete in 35 minutes. The fused lead resinate obtained had a drop melting point of 170° C. and a lead content of 33%. It was clear and homogeneous It will be understood that the details and examples hereinbefore set forth are illustrative only and that the invention as broadly described and claimed is in no way limited thereby.

What I claim and desire to protect by Letters Patent is:

1. A homogeneous fused lead resinate of a hydrogenated rosin, said resinate having a lead content greater than the equivalent combining proportion of the hydrogenated rosin but not in excess of about 40%, by weight.

2. A homogeneous fused lead resinate of a hydrogenated rosin saturated to the extent of at least 50% of both double bonds of the rosin acids contained therein, said resinate having a lead content greater than the equivalent combining proportion of the hydrogenated rosin but not in excess of about 40%, by weight.

3. A homogeneous fused lead resinate of a hydrogenated wood rosin, said resinate having a lead content greater than the equivalent combining proportion of the hydrogenated rosin but not in exces of about 40%, by weight.

4. A homogeneous fused lead resinate of a hydrogenated gum rosin, said resinate having a lead content greater than the equivalent combining proportion of the hydrogenated rosin but not in excess of about 40%, by weight.

5. The method of producing a homogeneous fused lead resinate of a hydrogenated rosin, said resinate having a lead content greater than the equivalent combining proportion of the hydrogenated rosin but not in exces of about 40%, by weight, which comprises fusing a hydrogenated rosin with a lead compound capable of reaction with the hydrogenated rosin, in an amount sufficient to give a resinate of the above defined lead content at a temperature within the range of about 200° C. to about 330° C.

6. The method of producing a homogeneous fused lead resinate of a hydrogenated rosin, said resinate having a lead content greater than the equivalent combining proportion of the hydrogenated rosin but not in excess of about 40%, by weight, which comprises fusing a hydrogenated rosin with a lead salt of a volatile weak acid in an amount sufficient to give a resinate of the above defined lead content at a temperature within the range of about 200° C. to about 330° C.

7. The method of producing a homogeneous fused lead resinate of a hydrogenated rosin, said resinate having a lead content greater than the equivalent combining proportion of the hydrogenated rosin but not in excess of about 40%, by weight, which comprises fusing a hydrogenated rosin with lead acetate in an amount sufficient to give a resinate of the above defined lead content at a temperature within the range of about 200° C. to about 330° C.

8. The method of producing a homogeneous fused lead resinate of a hydrogenated rosin, said resinate having a lead content greater than the equivalent combining proportion of the hydrogenated rosin but not in excess of about 40%, by weight, which comprises fusing a hydrogenated rosin with a mixture of lead oxide and lead acetate in an amount sufficient to give a resinate of the above defined lead content at a temperature within the range of about 200° C. to about 330° C.

HERSCHEL A. ELLIOTT.